United States Patent
Lee et al.

(10) Patent No.: US 11,444,653 B2
(45) Date of Patent: Sep. 13, 2022

(54) APPARATUS AND METHOD FOR TRANSMITTING AND RECEIVING SIGNALS ON MULTIPLE BANDS IN WIRELESS COMMUNICATION SYSTEM

(71) Applicant: SAMSUNG ELECTRONICS CO., LTD., Suwon-si (KR)

(72) Inventors: Jeongho Lee, Suwon-si (KR); Byungjoon Park, Suwon-si (KR); Sangho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/119,504

(22) Filed: Dec. 11, 2020

(65) Prior Publication Data

US 2021/0184719 A1 Jun. 17, 2021

(30) Foreign Application Priority Data

Dec. 12, 2019 (KR) .................... 10-2019-0165764

(51) Int. Cl.
*H04B 1/40* (2015.01)
*H04B 7/06* (2006.01)

(52) U.S. Cl.
CPC .............. *H04B 1/40* (2013.01); *H04B 7/0617* (2013.01)

(58) Field of Classification Search
CPC ........ H04B 1/40; H04B 7/0617; H04B 7/086; H04B 1/0067; H04B 1/0082; H04B 1/50; H04B 7/0408

(Continued)

(56) References Cited

U.S. PATENT DOCUMENTS 7,180,467 B2  2/2007  Fabrega-Sanchez et al.
7,397,868 B2  7/2008  Shi et al.
(Continued)

FOREIGN PATENT DOCUMENTS

KR   10-1829974   3/2018
WO   WO 2018119153 A2   6/2018

OTHER PUBLICATIONS

International Search Report and Written Opinion dated Apr. 1, 2021 in corresponding International Application No. PCT/KR2020/018207.

*Primary Examiner* — Ankur Jain
(74) *Attorney, Agent, or Firm* — Nixon & Vanderhye P.C.

(57) ABSTRACT

The present disclosure relates to a pre-5th-Generation (5G) or 5G communication system to be provided for supporting higher data rates Beyond 4th-Generation (4G) communication system such as Long Term Evolution (LTE). A transceiver in a wireless communication system may include: a first circuit configured to up-convert a first digital signal corresponding to a first band and to up-convert a second digital signal corresponding to a second band using a same intermediate frequency (IF) frequency, and to analog-convert the up-converted signals into a first analog signal and a second analog signal; a second circuit configured to up-convert the first analog signal and the second analog signal to produce a first radio frequency (RF) signal of the first band and a second RF signal of the second band, and to output an RF signal of a third bandwidth including the first RF signal and the second RF signal; and a third circuit configured to separate the RF signal of the third bandwidth into the first RF signal and the second RF signal, to adjust a phase of the first RF signal to perform beamforming in the first band, and to adjust a phase of the second RF signal to perform beamforming in the second band.

17 Claims, 16 Drawing Sheets

(58) Field of Classification Search
USPC .......................................................... 455/77
See application file for complete search history.

(56) References Cited

U.S. PATENT DOCUMENTS

| | | |
|---|---|---|
| 7,519,390 B2 | 4/2009 | Malone et al. |
| 8,120,532 B2 | 2/2012 | Rofougaran |
| 10,334,601 B2 | 6/2019 | Chen et al. |
| 2007/0099582 A1* | 5/2007 | Chen .................... H04B 1/0071 |
| | | 455/76 |
| 2008/0310487 A1 | 12/2008 | Hammerschmidt et al. |
| 2011/0075780 A1 | 3/2011 | Petrovic |
| 2016/0065263 A1 | 3/2016 | Lin et al. |
| 2018/0175808 A1* | 6/2018 | Ota ....................... H03F 1/3247 |
| 2020/0091608 A1 | 3/2020 | Alpman et al. |

* cited by examiner

APPARATUS AND METHOD FOR TRANSMITTING AND RECEIVING SIGNALS ON MULTIPLE BANDS IN WIRELESS COMMUNICATION SYSTEM

CROSS-REFERENCE TO RELATED APPLICATION

This application is based on and claims priority under 35 U.S.C. § 119 to Korean Patent Application No. 10-2019-0165764, filed on Dec. 12, 2019, in the Korean Intellectual Property Office, the disclosure of which is incorporated by reference herein in its entirety.

BACKGROUND

Field

The disclosure relates to a wireless communication system and, for example, to a method and apparatus for transmitting and receiving signals in a plurality of bands in a wireless communication system.

Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system may also be referred to as a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 5G system defines a plurality of usable bands. A network operator is capable of operating a 5G system in at least one band. If a communication service is provided using a plurality of bands, it may be required to simultaneously transmit or receive signals via the plurality of bands. In this instance, a transmission or reception scheme for efficiently processing signals may be required.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and apparatus for supporting a plurality of bands in a wireless communication system.

Embodiments of the disclosure provide a method and apparatus for simultaneously transmitting or receiving signals in a plurality of bands in a wireless communication system.

In accordance with an example embodiment of the disclosure, a transceiver in a wireless communication system may include: a first circuit configured to up-convert a first digital signal corresponding to a first band and up-convert a second digital signal corresponding to a second band using a same intermediate frequency (IF) frequency, and to analog-convert the up-converted signals into a first analog signal and a second analog signal; a second circuit configured to up-convert the first analog signal and the second analog signal to produce a first radio frequency (RF) signal of the first band and a second RF signal of the second band, and to output an RF signal of a third bandwidth including the first RF signal and the second RF signal; and a third circuit configured to separate the RF signal of the third bandwidth into the first RF signal and the second RF signal, to adjust a phase of the first RF signal to perform beamforming in the first band, and to adjust a phase of the second RF signal to perform beamforming in the second band.

In accordance with an example embodiment of the disclosure, a signal processing device for a transceiver in a wireless communication system may include: a conversion circuit configured to: up-convert a first digital signal corresponding to a first band and up-convert a second digital signal corresponding to a second band using a same intermediate frequency (IF) frequency; and analog-convert the up-converted signals to produce a first analog signal and a second analog signal.

In accordance with an example embodiment of the disclosure, a signal processing device for a transceiver in a wireless communication system may include: at least one mixer configured to up-convert a first analog signal and to up-convert a second analog signal of a same intermediate frequency (IF) frequency to produce a first radio frequency (RF) signal of a first band and a second RF signal of a second band; and a combiner comprising circuitry configured to produce an RF signal of a third bandwidth including the first RF signal and the second RF signal.

In accordance with an example embodiment of the disclosure, a signal processing device for a transceiver in a wireless communication system may include: a separator comprising circuitry configured to separate a radio frequency (RF) signal of a third bandwidth into a first RF signal of a first bandwidth corresponding to a first band and a second RF signal of a second bandwidth corresponding to a second band; and at least one phase modulator comprising circuitry configured to adjust the phase of the first RF signal to perform beamforming in the first band, and to adjust the phase of the second RF signal to perform beamforming in the second band.

In accordance with an example embodiment of the disclosure, a method of operating a transceiver in a wireless communication system, may include: converting a first digital signal corresponding to a first band and a second digital signal corresponding to a second band into a first analog signal corresponding to a first band and a second analog signal corresponding to the second band; up-converting the first analog signal and the second analog signal to produce a first radio frequency (RF) signal of the first band and a second RF signal of the second band; separating an RF signal of a third bandwidth including a first RF signal and a second RF signal into the first RF signal and the second RF signal; adjusting a phase of the first RF signal to perform beamforming in the first band; and adjusting a phase of the second RF signal to perform beamforming in the second band.

A method and apparatus according to various example embodiments of the disclosure may reduce the size of a circuit needed when transmitting and receiving a signal via a plurality of bands.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
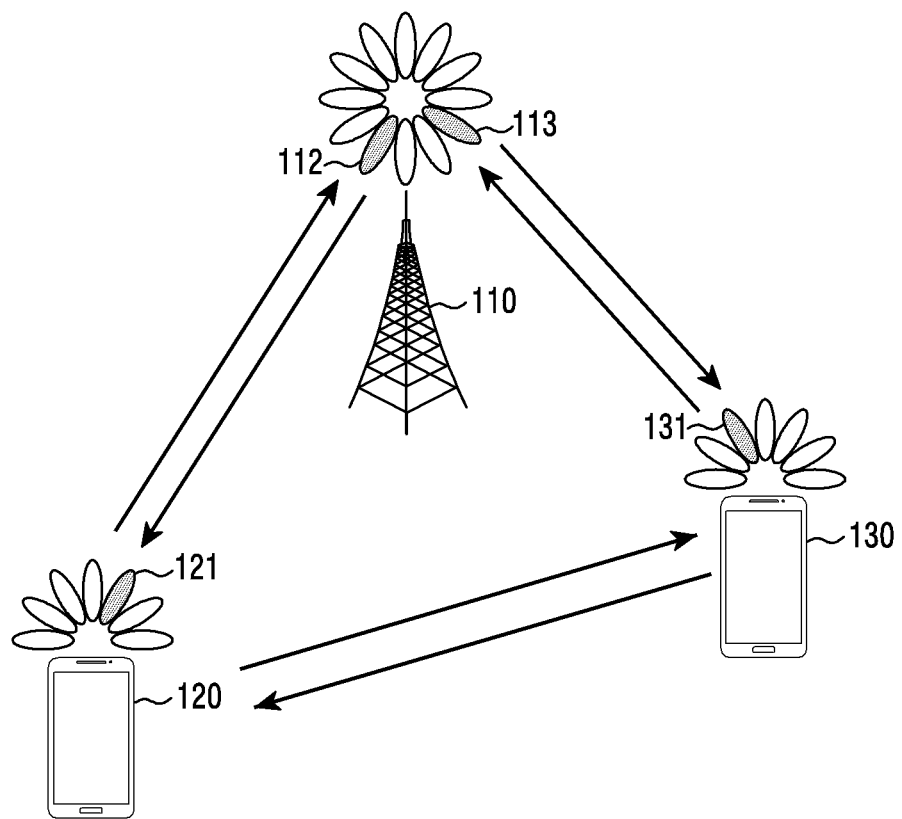
FIG. 1 is a diagram illustrating an example wireless communication system according to various embodiments.

The terms used in the disclosure are used to describe various example embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various example embodiments of the disclosure will be described based on an approach of hardware by way of example. However, various embodiments of the disclosure include a technology that uses both hardware and software, and thus the various embodiments of the disclosure may not exclude the perspective of software.

The disclosure relates to a method and apparatus for transmitting or receiving signals in a plurality of bands in a wireless communication system. For example, the disclosure relates generally to technology for simultaneously transmitting or receiving a signal via a plurality of bands in a wireless communication system.

Hereinafter, terms that refer to signals, terms that refer to channels, terms that refer to control information, terms that refer to network entities, terms that refer to elements of an apparatus, and the like are provided for ease of description. Therefore, the disclosure is not limited to the terms used in the descriptions, and other terms having the same technical meaning may be used.

In the disclosure, the terms "physical channel" and "signal" may be interchangeably used with data or a control signal. For example, although a physical downlink shared channel (PDSCH) is a term that may refer, for example, to a physical channel via which data is transmitted, the PDSCH may be used to refer to data. In the disclosure, the expression "transmit a physical channel" may be understood as having the same or similar meaning as the expression "transmit data or a signal via a physical channel".

In the disclosure provided below, higher signaling may refer, for example, to a method of transferring a signal by a base station to a terminal using a downlink data channel in a physical layer, or a method of transferring a signal by a terminal to a base station using an uplink data channel in a physical layer. Higher signaling may be understood to include, for example, radio resource control (RRC) signaling or a media access control (MAC) control element (CE).

In addition, in the disclosure, the expressions, "greater than" or "less than" are used to determine whether a predetermined condition is satisfied or fulfilled. However, the expressions are merely used to express an example, and do not exclude the expressions "greater than or equal to" or "less than or equal to". A condition including the expression "greater than or equal to" may be replaced with a condition including the expression "greater than", a condition including the expression "less than or equal to" may be replaced with a condition including the expression "less than", and a condition including the expression "greater than or equal to and less than" may be replaced with a condition including the expression "greater than and less than or equal to".

Although the disclosure describes various example embodiments using terms according to various communication standards (e.g., $3^{rd}$ generation partnership project (3GPP)), the embodiments are merely examples. The various example embodiments may be easily modified and applied to other communication systems.

FIG. 1 is a diagram illustrating an example wireless communication system according to various embodiments. FIG. 1 illustrates a base station 110, a terminal 120, and a terminal 130, as some of the nodes that use wireless channels in a wireless communication system. Although FIG. 1 illustrates a single base station, another base station which is the same as or similar to the base station 110 may be further included.

The base station 110 may include a network infrastructure that provides radio access to terminals 120 and 130. The base station 110 may have a coverage area defined by a predetermined geographical area based on the distance at which the base station 110 is capable of delivering a signal. The base station 110 may be referred to, for example, as an access point (AP), an eNodeB (eNB), a $5^{th}$ generation node (5G node), a next generation nodeB (gNB), a wireless point, a transmission/reception point (TRP), or other terms having the technical meaning equivalent thereto, in addition to a base station.

Each of the terminals 120 and 130 may include a device used by a user, and may perform communication with the base station 110 via a wireless channel. Depending on the case, at least one of the terminals 120 and 130 may operate without manipulation by a user. For example, at least one of the terminals 120 and 130 may include a device that performs machine type communication (MTC), and may not be carried by a user. Each of the terminals 120 and 130 may be referred to, for example, and without limitation, as a user equipment (UE), a mobile station, a subscriber station, a remote terminal, a wireless terminal, a user device, or other terms having meanings equivalent thereto, in addition to a terminal.

The base station 110, the terminal 120, and the terminal 130 may transmit and receive wireless signals in a millimeter wave (mmWave) band (e.g., 28 GHz, 30 GHz, 38 GHz, and 60 GHz). In order to improve a channel gain, the base station 110, the terminal 120, and the terminal 130 may perform beamforming. The beamforming may include transmission beamforming and reception beamforming. For example, the base station 110, the terminal 120, and the terminal 130 may assign directivity to a transmission signal or a reception signal. The base station 110 and the terminals 120 and 130 may select serving beams 112, 113, 121, and 131 via a beam search procedure or a beam management procedure. After the serving beams 112, 113, 121, and 131 are selected, subsequent communication may be performed using resources which are in a quasi-co-located (QCL) relationship with resources used for transmitting the serving beams 112, 113, 121, and 131.

If large-scale characteristics of a channel that delivers a symbol on a first antenna port can be inferred from a channel that delivers a symbol on a second antenna port, it is estimated that the first antenna port and the second antenna port have a QCL relationship therebetween. For example, the large-scale characteristics may include at least one of a delay spread, a Doppler spread, a Doppler shift, an average gain, an average delay, and a spatial receiver parameter, or the like.

Figure 2:
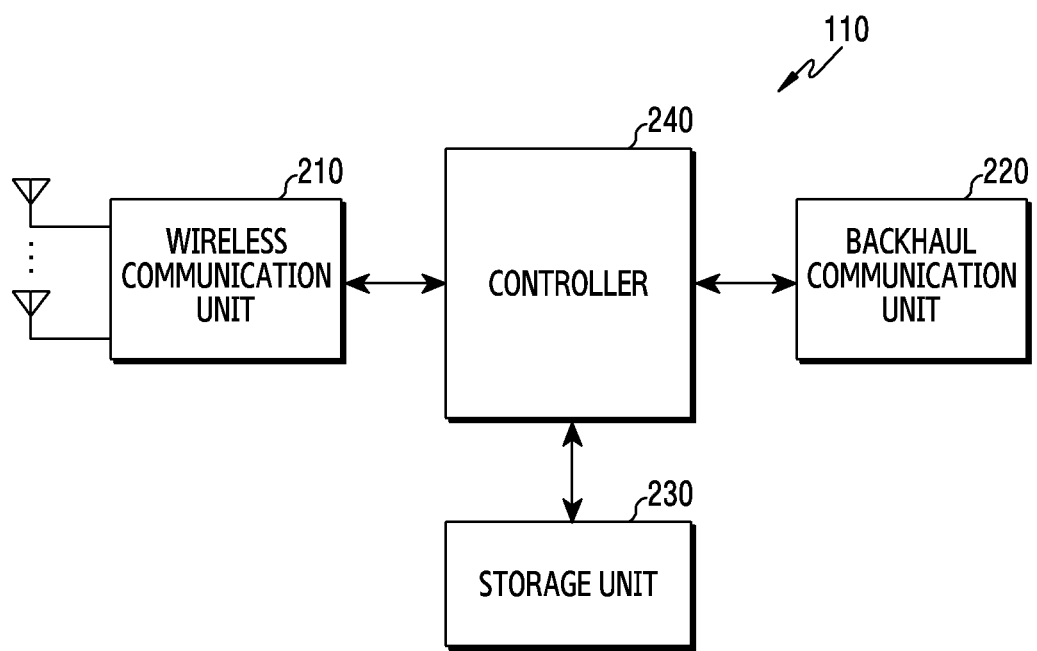
FIG. 2 is a block diagram illustrating an example configuration of a base station in a wireless communication system according to various embodiments.

FIG. 2 is a block diagram illustrating an example configuration of a base station in a wireless communication system according to various embodiments. The configuration of FIG. 2 may be understood as the configuration of the base station 110. The term, "unit" or "er" used hereinafter may refer to a unit for processing at least one function or operation and may be implemented as hardware, software, or a combination of hardware and software.

Referring to FIG. 2, the base station may include a wireless communication unit (e.g., including wireless communication circuitry) 210, a backhaul communication unit (e.g., including backhaul circuitry) 220, a storage unit 230, and a controller (e.g., including processing circuitry) 240.

The wireless communication unit 210 may include various communication circuitry and performs functions for transmitting or receiving a signal via a wireless channel. For example, the wireless communication unit 210 performs a function of conversion between a baseband signal and a bitstream according to the physical layer standard of a system. For example, in the case of data transmission, the wireless communication unit 210 produces complex symbols by encoding and modulating a transmission bitstream. In addition, in the case of data reception, the communication unit 210 restores a reception bitstream by demodulating and decoding a baseband signal.

In addition, the wireless communication unit 210 upconverts a baseband signal into a radio-frequency (RF) band signal and transmits the same via an antenna, and downconverts an RF band signal received via an antenna into a baseband signal. The wireless communication unit 210 may include various circuitry, including, for example, a transmission filter, a reception filter, an amplifier, a mixer, an oscillator, a digital-to-analog convertor (DAC), an analog-to-digital convertor (ADC), and the like. In addition, the wireless communication unit 210 may include a plurality of transmission/reception paths. In addition, the wireless communication unit 210 may include at least one antenna array including a plurality of antenna elements.

From the perspective of hardware, the wireless communication unit 210 may be configured with a digital unit and an analog unit. The analog unit may include a plurality of sub-units depending on an operating power, an operating frequency, or the like. The digital unit may be implemented as at least one processor (e.g., a digital signal processor (DSP)).

The wireless communication unit 210 may transmit and receive signals as described above. Accordingly, the entirety or a part of the wireless communication unit 210 may be referred to as a "transmitter", "receiver", or "transceiver". In addition, the transmission and reception performed via a wireless channel, which is described in the following descriptions, may be understood to refer to the above-described processing being performed by the wireless communication unit 210.

The backhaul communication unit 220 may include various backhaul circuitry and provides an interface for performing communication with other nodes within the network. For example, the backhaul communication unit 220 converts a bitstream transmitted from a base station to another node, for example, another access node, another base station, a higher node, a core network, or the like, into a physical signal, and converts a physical signal received from another node into a bitstream.

The storage unit 230 may store data, such as a basic program for operating a base station, an application program, configuration information, and the like. The storage unit 230 may be implemented as a volatile memory, a non-volatile memory, or a combination of a volatile memory and a non-volatile memory. The storage unit 230 may provide data stored therein in response to a request from the controller 240.

The controller 240 may include various processing circuitry and controls the overall operation of the base station. For example, the controller 240 may transmit and receive signals via the wireless communication unit 210 or the backhaul communication unit 220. Further, the controller 240 records data in the storage unit 230 and reads the recorded data. The controller 240 may perform the functions of a protocol stack that the communication standard requires. Depending on implementation, the protocol stack may be included in the wireless communication unit 210. The controller 240 may include at least one processor. According to various embodiments, the controller 240 may perform control so that a base station performs operations according to various embodiments described below.

Figure 3:
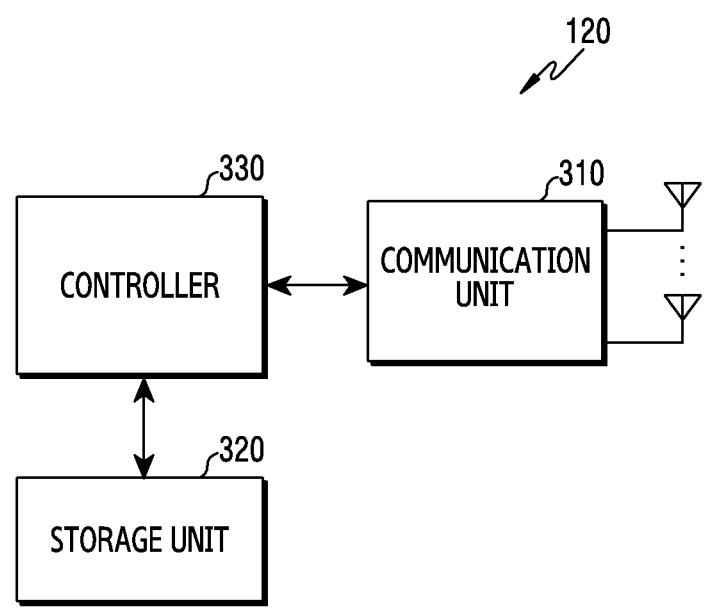
FIG. 3 is a block diagram illustrating an example configuration of a terminal in a wireless communication system according to various embodiments.

FIG. 3 is a block diagram illustrating an example configuration of a terminal in a wireless communication system according to various embodiments. The configuration illustrated in FIG. 3 may be understood as the configuration of the terminal 120. The term, "unit" or "er" used hereinafter may refer to a unit for processing at least one function or operation, and may be implemented as hardware, software, or a combination of hardware and software.

Referring to FIG. 3, the terminal includes a communication unit (e.g., including communication circuitry) 310, a storage unit 320, and a controller (e.g., including processing circuitry) 330.

The communication unit 310 may include various communication circuitry and performs functions for transmitting or receiving a signal via a wireless channel. For example, the wireless communication unit 310 performs a function of conversion between a baseband signal and a bitstream according to the physical layer standard of a system. For example, in the case of data transmission, the communication unit 310 produces complex symbols by encoding and modulating a transmission bitstream. In addition, in the case of data reception, the communication unit 310 restores a reception bitstream by demodulating and decoding a baseband signal. In addition, the communication unit 310 up-converts a baseband signal into an RF band signal and transmits the same via an antenna, and down-converts an RF band signal received via an antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. In addition, the communication unit 310 may include at least one antenna array including a plurality of antenna elements. From the perspective of hardware, the communication unit 310 may include a digital circuit and an analog circuit (e.g., a radio frequency integrated circuit (RFIC)). The digital circuit and the analog circuit may be implemented as a single package. In addition, the communication unit 310 may include a plurality of RF chains. In addition, the communication unit 310 may perform beamforming.

The communication unit 310 may transmit and receive signals as described above. Accordingly, the entirety or a part of the communication unit 310 may be referred to as a "transmitter", "receiver", or "transceiver". In addition, transmission and reception performed via a wireless channel, which is described in the following descriptions, may be understood to refer to the above-described processing being performed by the communication unit 310.

The storage unit 320 may store data, such as a basic program, an application program, configuration information, and the like for operating a terminal. The storage 320 may be implemented as a volatile memory, a non-volatile memory, or a combination of a volatile memory and a non-volatile memory. The storage unit 320 may provide data stored therein in response to a request from the controller 330.

The controller 330 may include various processing circuitry and control the overall operations of a terminal. For example, the controller 330 may perform signal transmission and reception via the communication unit 310. Further, the controller 330 records data in the storage unit 320 and reads the recorded data. The controller 330 may perform the functions of a protocol stack that the communication standard requires. The controller 330 may include at least one processor or micro-processor, or may be a part of the processor. In addition, a part of the communication unit 310 and the controller 330 may be referred to as a communication processor (CP). According to various embodiments, the controller 330 may perform control so that a terminal performs operations according to various embodiments described below.

Figure 4:
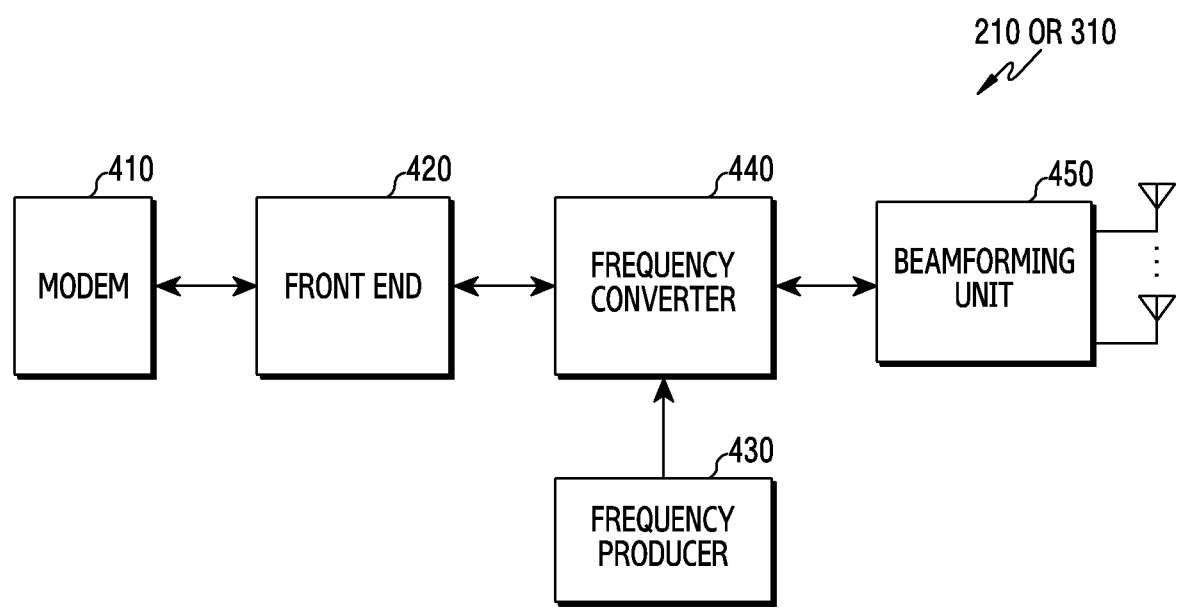
FIG. 4 is a block diagram illustrating an example configuration of a communication unit in a wireless communication system according to various embodiments.

FIG. 4 is a block diagram illustrating an example configuration of a communication unit in a wireless communication system according to various embodiments. FIG. 4 illustrates an example detailed configuration of the wireless communication unit 210 of FIG. 2 or the communication unit 310 of FIG. 3.

Referring to FIG. 4, the communication unit may include a modem 410, a front end 420, a frequency producer 430, a frequency convertor 440, and a beamforming unit (e.g., including beamforming circuitry) 450.

The modem 410 may perform channel encoding and modulating of transmission bits so as to produce a baseband digital signal. The modem 410 may perform demodulating and channel decoding of a baseband digital signal so as to restore reception bits. For example, if signals are simultaneously transmitted via a plurality of bands, the modem 410 may produce a baseband signal including signals respectively corresponding to the plurality of bands.

The front end 420 may include various circuitry and convert a baseband signal produced by the modem 410 into an analog signal. The front end 420 may convert an analog signal provided from the frequency converter 440 into a digital signal. The front end 420 may have a broadband characteristic that is capable of processing a broadband signal including signals transmitted or received via a plurality of bands. The broadband signal may be a signal including a bandwidth greater than or equal to the sum of bandwidths of two or more bands. The front end 420 may be referred to as a digital-analog front end (DAFE).

The frequency producer 430 may produce at least one frequency signal (e.g., a sine-wave signal) for frequency conversion by the frequency converter 440. The frequency producer 430 may produce a plurality of frequency signals corresponding to a plurality of bands supported by a communication unit. The number of frequency signals output from the frequency producer 430 may be changed depending on the number of bands used for the current communication.

The frequency converter 440 may up-convert a signal provided from the front end 420 into an RF signal of a corresponding band. The frequency converter 440 may down-convert an RF signal provided from the beamforming unit 450. If a plurality of bands are used simultaneously, the frequency converter 440 may separate a provided broadband signal into signals for respective bands, may convert frequencies, and combine the frequency-converted signals into a broadband signal.

The beamforming unit 450 may include various circuitry and perform transmission beamforming for a signal provided from the frequency converter 440, and may perform reception beamforming for a signal received via an antenna. If a plurality of bands are used simultaneously, the beamforming unit 450 may shift the phase of a signal, separate a broadband signal into signals for respective bands, and combine the signals for respective bands into a broadband signal.

The elements illustrated in FIG. 4 may be implemented as separate integrated circuit (IC) chips. At least two of the elements illustrated in FIG. 4 may be implemented as a single IC chip.

The structure illustrated in FIG. 4 may be used for processing signals of two or more bands. In order to process the signals of two or more bands, two chains may be used. According to various embodiments, at least one of a series of components included in two chains may be configured to process a signal belonging to two bands via a single operation. For example, in at least one of a series of signal processing operations, a plurality of bands may be processed as a single broadband signal, and thus, it may be considered as a single signal. Elements for separating a single signal into signals for respective bands, and elements for combining signals for respective bands into a single signal may be included.

Based on the structure described with reference to FIG. 4, a plurality of bands may be supported. Signals transmitted or received via a plurality of bands may be converted in the frequency axis as shown in FIG. 5.

Figure 5:
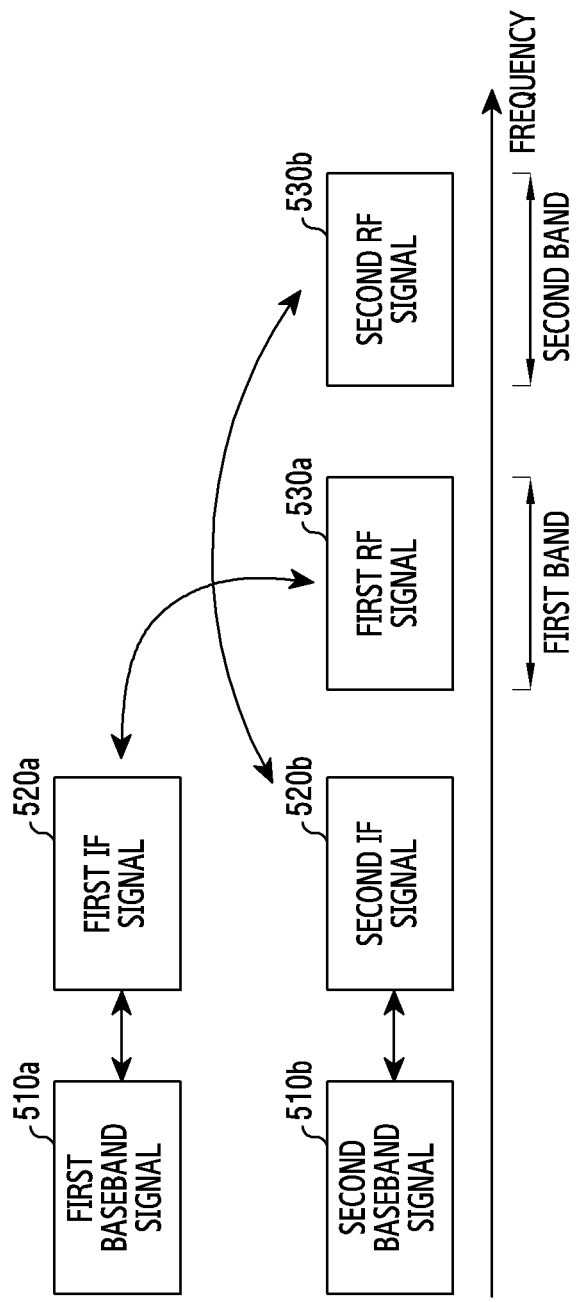
FIG. 5 is a diagram illustrating an example frequency conversion relationship between signals in a wireless communication system according to various embodiments.

FIG. 5 is a diagram illustrating an example frequency conversion relationship between signals in a wireless communication system according to various embodiments.

Referring to FIG. 5, a first baseband signal 510a and a second baseband signal 510b may be up-converted into a first IF signal 520a and a second IF signal 520b, respectively. The first IF signal 520a and the second IF signal 520b may belong to the same IF band. The first IF signal 520a and the second FI signal 520b may be up-converted into a first RF signal 530a and a second RF signal 530b. The first RF signal 530a may belong to a first band, and the second RF signal 530b may belong to a second band. Similarly, the first RF signal 530a and the second RF signal 530b may be down-converted into the first RF signal 520a and the second IF signal 520b. The first IF signal 520a and the second IF signal 520b may be down-converted into the first baseband signal 510a and the second baseband signal 510b.

Hereinafter, an example structure of each element of the communication unit will be described. Hereinafter, the structure described with reference to FIGS. 6A, 6B, 7A, 7B, 8A and 8B may have a capability of processing two bands. However, the disclosure may be easily extended to a circuit having a capability of processing three or more bands.

Figure 6A:
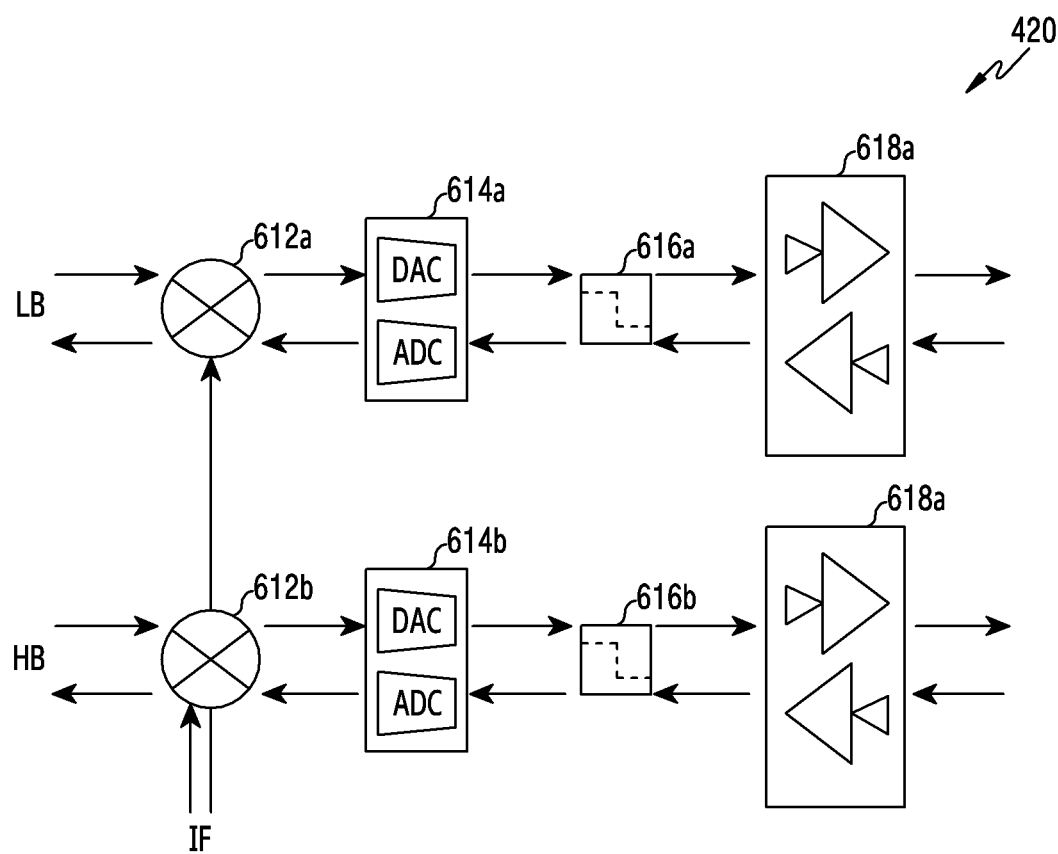
FIG. 6A is a diagram illustrating an example configuration of a front end in a wireless communication system according to various embodiments.

FIG. 6A is a diagram illustrating an example configuration of the front end 420 in a wireless communication system according to various embodiments. Referring to FIG. 6A, the front end 420 may include a first mixer 612a, a second mixer 612b, a first conversion circuit 614a, a second conversion circuit 614b, a first filter 616a, a second filter 616b, a first amplification circuit 618a, and a second amplification circuit 618b.

The first mixer 612a and the second mixer 612b may perform frequency up/down conversion between baseband signals and IF signals. The first mixer 612a may process a baseband signal corresponding to a first band (e.g., a low band (LB)), and the second mixer 612b may process a baseband signal corresponding to a second band (e.g., high band (HB)). The first mixer 612a and the second mixer 612b may receive frequency signals of an IF band from an oscillator (not illustrated). The frequency signals of the IF band provided to the first mixer 612a and the second mixer 612b may have the same frequency. For example, the frequency signals of the IF band may have a frequency of 9.75 GHz.

Each of the first conversion circuit 614a and the second conversion circuit 614b may include a DAC for converting a transmission signal and an ADC for converting a reception signal. the first conversion circuit 614a may process an IF band signal corresponding to the first band (e.g., a low band (LB)), and the second conversion circuit 614b may process an IF band signal corresponding to the second band (e.g., high band (HB)).

The first filter 616a and the second filter 616b may remove unnecessary frequency components from the IF signals. The first filter 616a may process an IF band signal corresponding to the first band (e.g., a low band (LB)), and the second filter 616b may process an IF band signal corresponding to the second band (e.g., high band (HB)).

The first amplification circuit 618a and the second amplification circuit 618b may amplify a transmission signal or a reception signal. The first amplification circuit 618a may process an IF band signal corresponding to the first band (e.g., a low band (LB)), and the second amplification circuit 618b may process an IF band signal corresponding to the second band (e.g., high band (HB)). Each of the first amplification circuit 618a and the second amplification circuit 618b may include a power amplifier (PA) or a low noise amplifier (LNA).

As described in the embodiment provided with reference to FIG. 6A, the front end 420 may include a plurality of independent paths for processing signals corresponding to a plurality of bands. The frequency of IF band signals produced by the plurality of paths may be substantially the same. In other words, the frequency of a frequency signal used in a mixing operation for conversion between a baseband signal and an IF band signal may be substantially the same in each path.

Figure 6B:
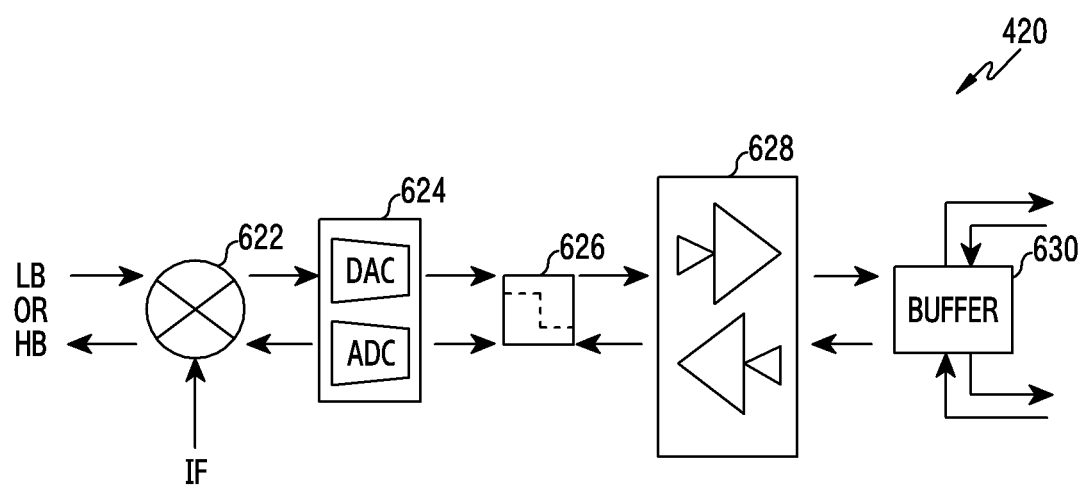
FIG. 6B is a diagram illustrating an example configuration of a front end in a wireless communication system according to various embodiments.

FIG. 6B is a diagram illustrating an example configuration of the front end 420 in a wireless communication system according to various embodiments. Referring to FIG. 6B, the front end 420 may include a mixer 622, a conversion circuit 624, a filter 626, an amplification circuit 628, and a buffer 630.

The mixer 622 may perform up/down conversion between a baseband signal and an IF signal. The mixer 622 may receive frequency signals of an IF band from an oscillator (not illustrated). The conversion circuit 624 may include a DAC for converting a transmission signal and an ADC for converting a reception signal. The filter 626 may remove an unnecessary frequency component from IF signals. The amplification circuit 628 may amplify a transmission signal or a reception signal. The amplification circuit 628 may include a PA or an LNA.

The buffer 630 may temporarily store, or may temporarily store and then output a signal corresponding to at least a part of a plurality of bands. For example, in the case of transmission, the buffer 630 may sequentially store IF band signals processed by the mixer 622, the conversion circuit 624, the filter 626, and the amplification circuit 628, and simultaneously, may output the same. As another example, in the case of reception, the buffer 630 may store a plurality of IF band signals provided from the frequency converter 440, and may sequentially output the same. For example, the buffer 630 may include a circuit that bypasses a signal, and a circuit that delays delivery of another signal.

As described in the embodiment provided with reference to FIG. 6B, the front end 420 may include a single path for processing signals corresponding to a plurality of bands. Accordingly, a plurality of signals may share a single path according to a time-division scheme. A plurality of signals is repeatedly processed via a single path, and thus, the frequency of the processed IF band signals may be substantially the same. When compared to the embodiment of FIG. 6A, in the case of the embodiment of FIG. 6B, the number of paths included is decreased and thus, the size of a circuit may be decreased. Conversely, in the case of the embodiment of FIG. 6A, a plurality of signals may be processed simultaneously, signal processing is promptly performed.

Figure 7A:
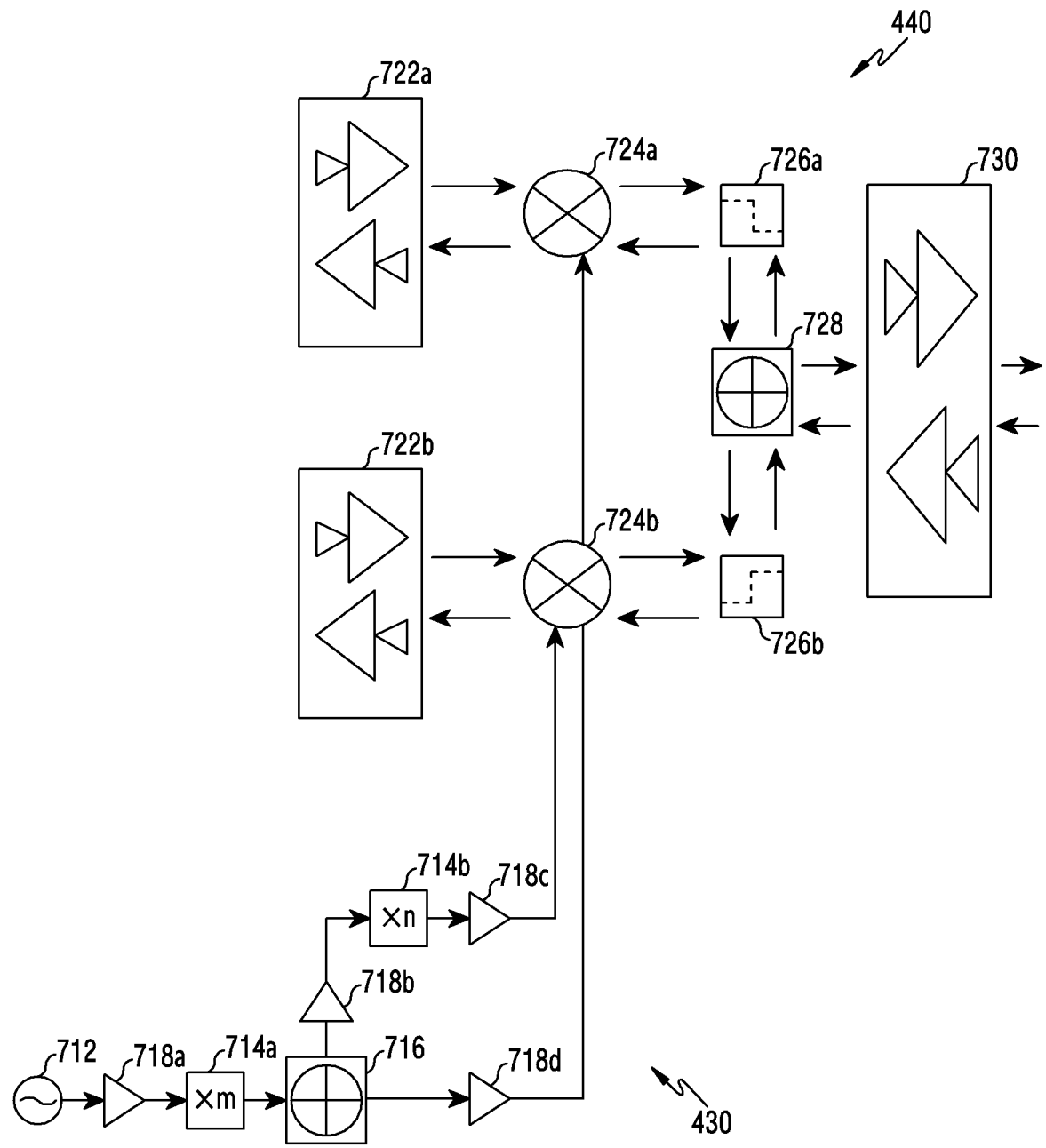
FIG. 7A is a diagram illustrating an example configuration of a frequency producer and a frequency converter in a wireless communication system according to various embodiments.

FIG. 7A is a diagram illustrating an example configuration of the frequency producer 430 and the frequency converter 440 in a wireless communication system according to various embodiments. Referring to FIG. 7A, the frequency procedure 430 and the frequency converter 440 may include an LO (e.g., oscillator) 712, a first multiplier 714a, a second multiplier 714b, a separator 716, a first amplifier 718a, a second amplifier 718b, a third amplifier 718c, a fourth amplifier 718d, a first amplification circuit 722a, a second amplification circuit 722b, a first mixer 724a, a second mixer 724b, a first filter 726a, a second filter 726b, a frequency combiner/separator 728, and a broadband amplification circuit 730.

The LO 712 may produce a fundamental frequency signal. The frequency signal may be amplified by the first amplifier 718a and may be converted into an m-fold frequency signal by the first multiplier 714a. The frequency signal may be provided to two paths by the separator 716. A signal provided to a first path may be amplified by the second amplifier 718b, may be converted into an n-fold frequency signal by the second multiplier 714b, and may be amplified by the third amplifier 718c. A signal provided to a second path may be amplified by the fourth amplifier 718d. Accordingly, a signal output via the first path may have a frequency, which corresponds to a first band, and is m×n times the fundamental frequency. A signal output via the second path may have a frequency, which corresponds to a second band, and is m times the fundamental frequency. For example, if m=3 and n=2 and the fundamental frequency is 4.875 GHz, the frequency of the signal output via the first path may be 29.26 GHz, and the frequency of the signal output via the second path may be 14.625 GHz.

The first amplification circuit 722a and the second amplification circuit 722b may amplify IF signals. The first amplification circuit 722a may process an IF band signal corresponding to a first band (e.g., a low band (LB)), and the second amplification circuit 722b may process an IF band signal corresponding to a second band (e.g., high band (HB)). Each of the first amplification circuit 722a and the second amplification circuit 722b may include a PA and an LNA.

The first mixer 724a may perform up/down conversion between an RF signal and an IF signal in the first band. The first mixer 724a may use a frequency signal corresponding to the first band provided from the frequency producer 430. The second mixer 724b may perform up/down conversion between an RF signal and an IF signal in the second band. The second mixer 724b may use a frequency signal corresponding to the second band provided from the frequency producer 430.

The first filter 726a may remove an unnecessary component, excluding the RF signal of the first band, from a signal up-converted by the first mixer 724a or an LB signal separated by the frequency combiner/separator 728. The first filter 726a may be a low pass filter (LPF). The second filter 726b may remove an unnecessary component, excluding the RF signal of the second band, from a signal up-converted by the second mixer 724b or a HB signal separated by the frequency combiner/separator 728. The second filter 726b may be a high pass filter (HPF).

The frequency combiner/separator 728 may separate a broadband RF signal into two RF signals for respective bands, or may combine two RF signals for respective bands into a broadband RF signal. The two RF signals may include an LB signal and a HB signal which are separated based on a predetermined frequency (e.g., a center frequency) from a broadband RF signal.

A broadband amplification circuit 730 may amplify an RF signal. The amplification circuit 730 may include a PA or an LNA. The broadband amplification circuit 730 may have a broadband characteristic that is capable of processing a broadband signal including RF signals of a plurality of bands.

In the embodiment described with reference to FIG. 7A, frequency signals having two different frequencies may be produced from a single oscillator (e.g., LO 712). According to another embodiment, a plurality of oscillators may be used to produce frequency signals having different frequencies. For example, the frequency producer 430 may include a first LO for producing a frequency signal corresponding to the first band, and a second LO for producing a frequency signal corresponding to the second band.

Figure 7B:
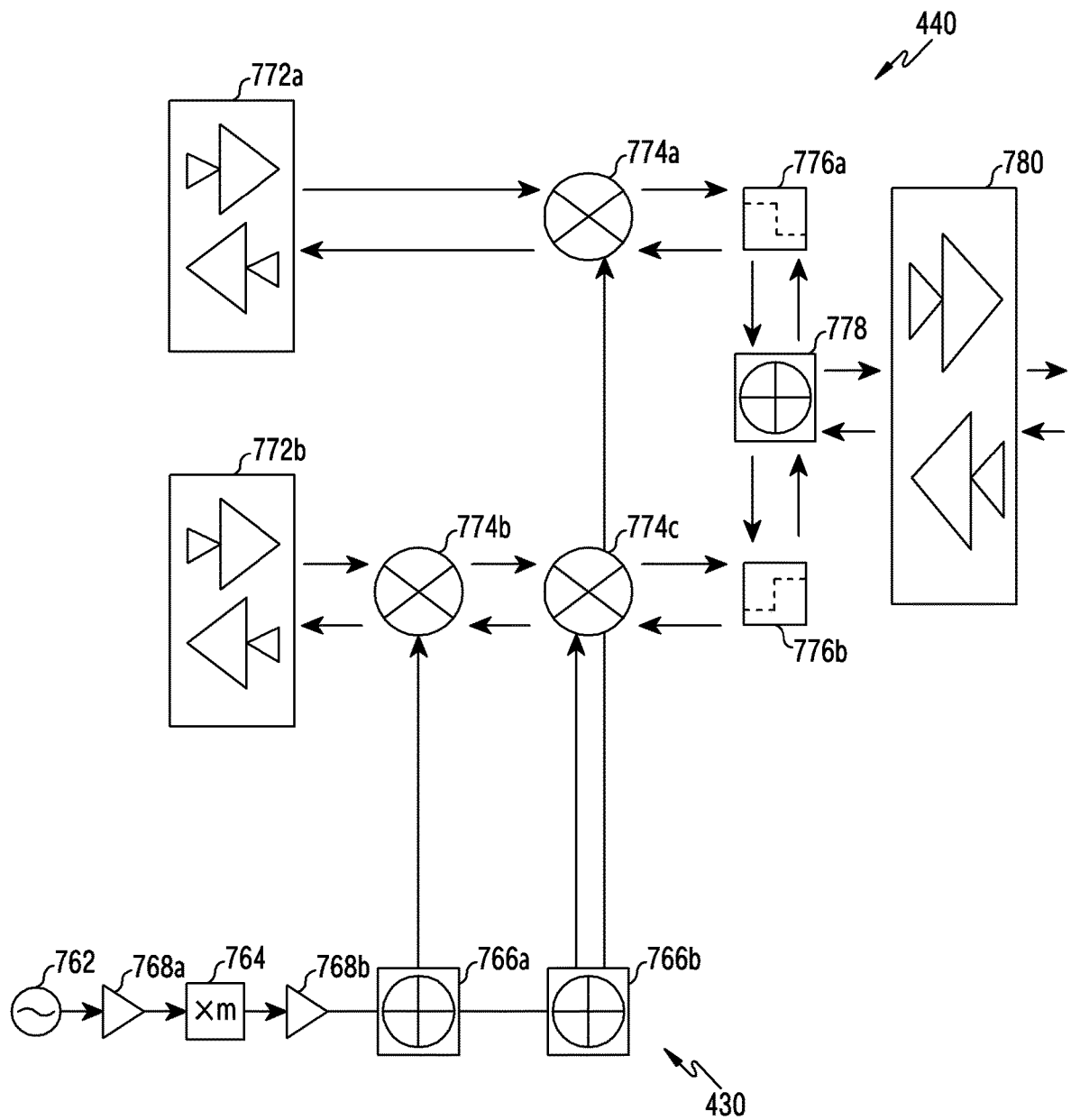
FIG. 7B is a diagram illustrating an example configuration of a frequency producer and a frequency converter in a wireless communication system according to various embodiments.

FIG. 7B is a diagram illustrating an example configuration of the frequency producer 430 and the frequency converter 440 in a wireless communication system according to various embodiments. Referring to FIG. 7B, the frequency procedure 430 and the frequency converter 440 may include an LO 762, a multiplier 764, a first separator 766a, a second separator 766b, a first amplifier 768a, a second amplifier 768b, a first amplification circuit 772a, a second amplification circuit 772b, a first mixer 774a, a second mixer 774b, a third mixer 774c, a first filter 776a, a second filter 776b, a frequency combiner/separator 778, and a broadband amplification circuit 780.

The LO 762 may produce a fundamental frequency signal. The frequency signal may be amplified by the first amplifier 768a, and may be converted into an m-fold frequency signal by the multiplier 764. The m-fold frequency signal may be amplified by the second amplifier 768b, and may be provided to a plurality of paths by the first separator 766a and the second separator 766b. For example, if m=3 and the fundamental frequency may be 4.875 GHz, the frequency of signals output to the plurality of paths may be 14.625 GHz. According to various embodiments, the first separator 766a and the second separator 766b may be replaced with a single separator including three or more output terminals.

The first amplification circuit 772a and the second amplification circuit 772b may amplify IF signals. The first amplification circuit 772a may process an IF band signal corresponding to a first band (e.g., a low band (LB)), and the second amplification circuit 772b may process an IF band signal corresponding to a second band (e.g., high band (HB)). Each of the first amplification circuit 772a and the second amplification circuit 772b may include a PA and an LNA.

The first mixer 774a may perform up/down conversion between an RF signal and an IF signal in the first band. The first mixer 774a may use a frequency signal provided from the second separator 766b of the frequency producer 430. The second mixer 774b and the third mixer 774c may perform up/down conversion between an RF signal and an IF signal in the second band. The second mixer 774b may use a frequency signal provided from the first separator 766a of the frequency producer 430, and the third mixer 774c may use a frequency signal provided from the second separator 766b of the frequency producer 430. For example, the RF signal of the second band may be produced via mixing operations repeatedly performed two times using signals of the same frequency.

The first filter 776a may remove an unnecessary component, excluding the RF signal of the first band, from a signal up-converted by the first mixer 774a or an LB signal separated by the frequency combiner/separator 778. The first filter 776a may be a low pass filter (LPF). The second filter 776b may remove an unnecessary component, excluding the RF signal of the second band, from a signal up-converted by the second mixer 774b or an HB signal separated by the frequency combiner/separator 778. The second filter 776b may be a high pass filter (HPF).

The frequency combiner/separator 778 may separate a broadband RF signal into two RF signals for respective bands, or may combine two RF signals for respective bands into a broadband RF signal. The two RF signals may include an LB signal and a HB signal which are separated from a broadband RF signal based on a predetermined frequency (e.g., a center frequency).

The broadband amplification circuit 780 may amplify an RF signal. The amplification circuit 780 may include a PA or an LNA. The broadband amplification circuit 780 may have a broadband characteristic that is capable of processing a broadband signal including RF signals of a plurality of bands.

In the structure as illustrated in FIG. 7A or FIG. 7B, in the case of signal transmission, IF signals provided from the front end 420 may be amplified by the first amplification circuit 722a (or 772a) and the second amplification circuit 722b (or 772b), and may be up-converted into RF signals. The RF signals may be filtered by the first filter 726a (or 776a) and the second filter 726b (or 776b), and may be combined into a broadband RF signal by the frequency combiner/separator 728 (or 778). The broadband RF signal may be amplified by the broadband amplification circuit 730 (or 780), and may be provided to the beamforming unit 450.

In the structure as illustrated in FIG. 7A or 7B, in the case of signal reception, an RF signal provided from the beamforming unit 450 may be amplified by the broadband amplification circuit 730 (or 780), and may be separated into an LB signal and an HB signal by the frequency combiner/separator 728 (or 778). The LB signal and the HB signal provided to respective paths may be filtered by the first filter 726a (or 776a) and the second filter 726b (or 776b), and may be down-converted into IF signals. The IF signals may be amplified by the first amplification circuit 722a (or 772a) and the second amplification circuit 722b (or 772b), and may be provided to the front end 420.

Figure 8A:
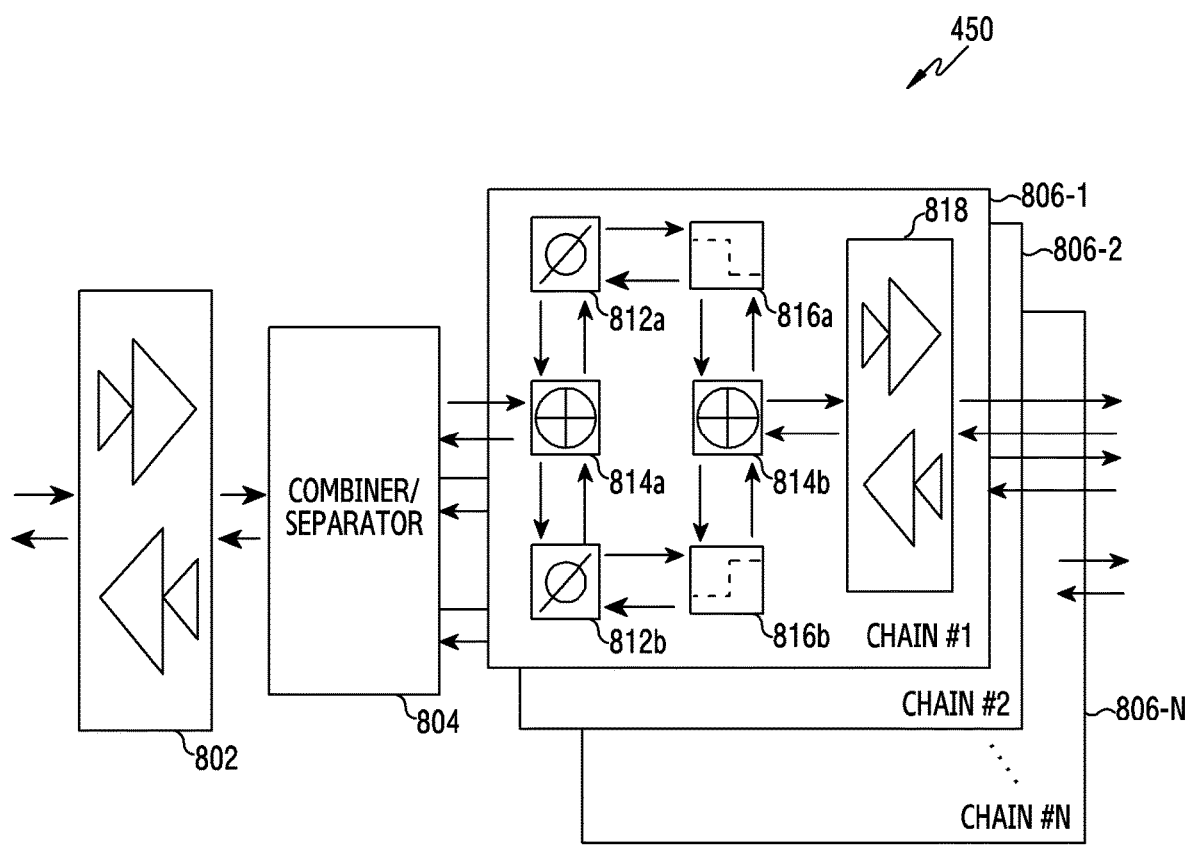
FIG. 8A is a diagram illustrating an example configuration of a beamforming unit in a wireless communication system according to various embodiments.

FIG. 8A is a diagram illustrating an example configuration of the beamforming unit 450 in a wireless communication system according to various embodiments. Referring to FIG. 8A, the beamforming unit 450 may include an amplification circuit 802, a combiner/separator 804, and chains 806-1 to 806-N.

The amplification circuit 802 may amplify a signal provided from the frequency converter 440 or a signal provided from the combiner/separator 804. The amplification circuit 802 may include a PA or an LNA. The amplification circuit 802 may have a broadband characteristic that is capable of processing a broadband signal including RF signals of a plurality of bands.

The combiner/separator 804 may separate a broadband RF signal into a plurality of signals, and may provide the signals to a plurality of chains 806-1 to 806-N. The combiner/separator 804 may combine signals provided from the plurality of chains 806-1 to 806-N into a single broadband RF signal. A plurality of signals provided to the plurality of chains 806-1 to 806-N or a plurality of signals provided from the plurality of chains 806-1 to 806-N may have the same bandwidth as that of the broadband RF signals. For example, signal separation by the combiner/separator 804 is understood as separation on power or duplication as opposed to signal separation based on a predetermined frequency.

The chains 806-1 to 806-N may be configured to be in similar structures. As illustrated in FIG. 8A, the first chain 806-1 may include a first phase modulator 812a, a second phase modulator 812b, a first frequency combiner/separator 814a, a second frequency combiner/separator 814b, a first filter 816a, a second filter 816b, and an amplification circuit 818.

The first phase modulator 812a may adjust the phase of an RF signal of a first band. The second phase modulator 812b may adjust the phase of an RF signal of a second band. A phase value used for adjustment may be indicated by another element (e.g., the modem 410).

The first frequency combiner/separator 814a may separate a broadband RF signal into two RF signals, or may combine two RF signals into a broadband RF signal. The second frequency combiner/separator 814b may separate a broadband RF signal into two RF signals for respective bands, or may combine two RF signals for respective bands into a broadband RF signal. The two RF signals may include an LB signal and a HB signal, which are separated from a broadband RF signal based on a predetermined frequency (e.g., a center frequency).

The first filter 816a may remove an unnecessary component, excluding the RF signal of the first band, from an LB signal of which the phase is adjusted by the first phase modulator 812a or an LB signal separated by the second frequency combiner/separator 814b. The first filter 816a may be an LBP. The second filter 816b may remove an unnecessary component, excluding the RF signal of the second band, from a HB signal of which the phase is adjusted by the second phase modulator 812b or a HB signal separated by the second frequency combiner/separator 814b. The second filter 816b may be a HBP.

The amplification circuit 818 may amplify an RF signal. The amplification circuit 818 may include a PA or an LNA. The amplification circuit 818 may have a broadband characteristic that is capable of processing a broadband signal including RF signals of a plurality of bands.

In the structure as illustrated in FIG. 8A, in the case of signal transmission, an RF signal provided from the frequency converter 440 may be amplified by the amplification circuit 802, may be separated into a plurality of signals by the combiner/separator 804, and may be provided to the chains 806-1 to 806-N. A signal provided to the first chain 806-1 may be separated into an LB signal and a HB signal by the first frequency combiner/separator 814a. The phases of the LB signal and the HB signal provided to respective paths may be adjusted by the first phase modulator 812a and the second phase modulator 812b, may be filtered by the first filter 816a and the second filter 816b, and may be combined into a broadband RF signal by the second frequency combiner/separator 814b. The broadband RF signal may be amplified by the amplification circuit 818, and may be transmitted via an antenna.

In the structure as illustrated in FIG. 8A, in the case of signal reception, a broadband RF signal received via an antenna may be amplified by the amplification circuit 818, and may be separated into an LB signal and a HB signal by the second frequency combiner/separator 814b. The LB signal and the HB signal provided to respective paths may be filtered by the first filter 816a and the second filter 816b, the phase of the filtered signals may be adjusted by the first phase modulator 812a and the second phase modulator 812b, and may be combined into a broadband RF signal by the first frequency combiner/separator 814a. Signals provided from the chains 806-1 to 806-N may be combined by the combiner/separator 804, may be amplified by the amplification circuit 802, and may be provided to the frequency convertor 440.

Figure 8B:
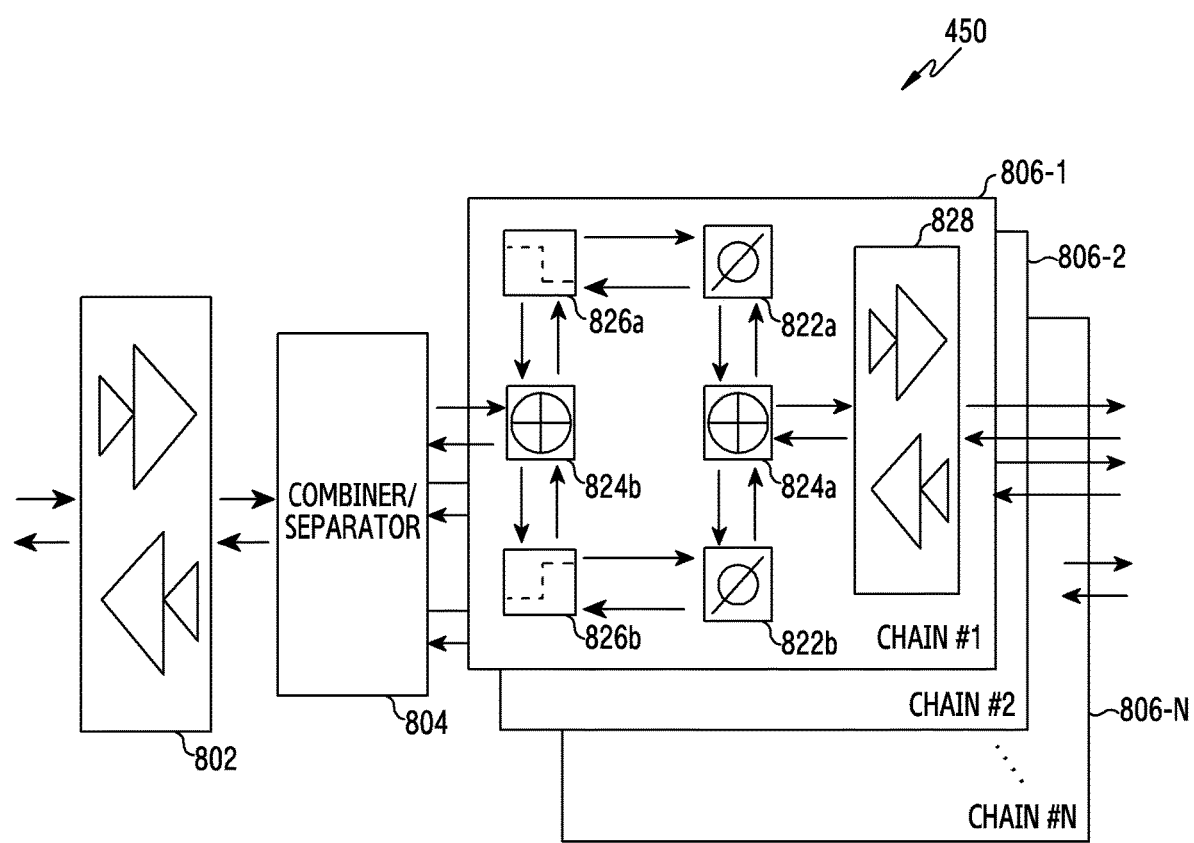
FIG. 8B is a diagram illustrating an example configuration of a beamforming unit in a wireless communication system according to various embodiments.

FIG. 8B is a diagram illustrating an example configuration of the beamforming unit 450 in a wireless communication system according to various embodiments. Referring to FIG. 8B, the beamforming unit 450 may include the amplification circuit 802, the combiner/separator 804, and the chains 806-1 to 806-N.

The amplification circuit 802 may amplify a signal provided from the frequency converter 440 or a signal provided from the combiner/separator 804. The amplification circuit 802 may include a PA or an LNA. The amplification circuit 802 may have a broadband characteristic that is capable of processing a broadband signal including RF signals of a plurality of bands.

The combiner/separator 804 may separate a broadband RF signal into a plurality of signals, and may provide the same to the plurality of chains 806-1 to 806-N. The combiner/separator 804 may combine signals provided from the plurality of chains 806-1 to 806-N into a single broadband RF signal. A plurality of signals provided to the plurality of chains 806-1 to 806-N or a plurality of signals provided from the plurality of chains 806-1 to 806-N may have the same bandwidth as that of the broadband RF signals. For example, signal separation by the combiner/separator 804 is understood as separation on power or duplication as opposed to signal separation performed based on a predetermined frequency.

The chains 806-1 to 806-N may be configured to be in similar structures. As illustrated in FIG. 8A, the first chain 806-1 may include a first phase modulator 822a, a second phase modulator 822b, a first frequency combiner/separator 824a, a second frequency combiner/separator 824b, a first filter 826a, a second filter 826b, and an amplification circuit 828.

The first phase modulator 822a may adjust the phase of an RF signal of a first band. The second phase modulator 822b may adjust the phase of an RF signal of a second band. A phase value used for adjustment may be indicated by another element (e.g., the modem 410).

The first frequency combiner/separator 824a may separate a broadband RF signal into two RF signals, or may combine two RF signals into a broadband RF signal. The second frequency combiner/separator 824b may separate a broadband RF signal into two RF signals for respective bands, or may combine two RF signals for respective bands into a broadband RF signal. The two RF signals may include an LB signal and a HB signal, which are separated from a broadband RF signal based on a predetermined frequency (e.g., a center frequency).

The first filter 826a may remove an unnecessary component, excluding the RF signal of the first band, from an LB signal of which the phase is adjusted by the first phase modulator 822a or an LB signal separated by the first frequency combiner/separator 824a. The first filter 826a may be an LBP. The second filter 826b may remove an unnecessary component, excluding the RF signal of the second band, from a HB signal of which the phase is adjusted by the second phase modulator 822b or a HB signal separated by the first frequency combiner/separator 824a. The second filter 826b may be a HBP.

The amplification circuit 828 may amplify an RF signal. The amplification circuit 828 may include a PA or an LNA. The amplification circuit 828 may have a broadband characteristic that is capable of processing a broadband signal including RF signals corresponding to a plurality of bands.

In the structure as illustrated in FIG. 8B, in the case of signal transmission, an RF signal provided from the frequency converter 440 may be amplified by the amplification circuit 802, may be separated into a plurality of signals by the combiner/separator 804, and may be provided to the chains 806-1 to 806-N. A signal provided to the first chain 806-1 may be separated into an LB signal and a HB signal by the first frequency combiner/separator 824a. The LB signal and the HB signal provided to respective paths may be filtered by the first filter 826a and the second filter 826b, the phase of the filtered signals may be adjusted by the first phase modulator 822a and the second phase modulator 822b, and may be combined into a broadband RF signal by the second combiner/separator 824b. Subsequently, signals provided from the chains 806-1 to 806-N may be combined by the combiner/separator 804, may be amplified by the amplification circuit 802, and may be provided to the frequency convertor 440.

In the structure as illustrated in FIG. 8B, in the case of signal reception, a broadband RF signal received via an antenna may be amplified by the amplification circuit 828, and may be separated into an LB signal and a HB signal by the second frequency combiner/separator 824b. The phases of the LB signal and the HB signal provided to respective paths may be adjusted by the first phase modulator 822a and the second phase modulator 822b, may be filtered by the first filter 826a and the second filter 826b, and may be combined into a broadband RF signal by the first combiner/separator 824a. The broadband RF signal may be amplified by the amplification circuit 802, and may be provided to the frequency converter 440.

In a circuit structure as described above, the frequency converter 440 and the beamforming unit 450 may be implemented as a single IC, or may be separated as two ICs. If the frequency converter 440 and the beamforming unit 450 are implemented as a single IC, the cost of mass production thereof and the entire size of the circuit may be reduced, which is advantageous. If the frequency converter 440 and the beamforming unit 450 are implemented as two ICs, an unnecessary component produced by the frequency converter 440 may be removed by an external filter, which is advantageous. The case in which the frequency converter 440 and the beamforming unit 450 are implemented as a single IC may be advantageous when a small number of antenna arrays are used. The case in which the frequency converter 440 and the beamforming unit 450 are implemented as a plurality of ICs may be advantageous when a large number of antennas arrays are used. For example, a terminal may include approximately 4 to 16 beamforming ICs. A base station may include approximately 16 to 256 beamforming ICs. If the frequency converter 440 and the beamforming unit 450 are implemented as a single IC, as many frequency converters as the number of beamforming units may be needed. If an excessive number of frequency converters are repetitiously used, power may be unnecessarily consumed.

Figure 9A:
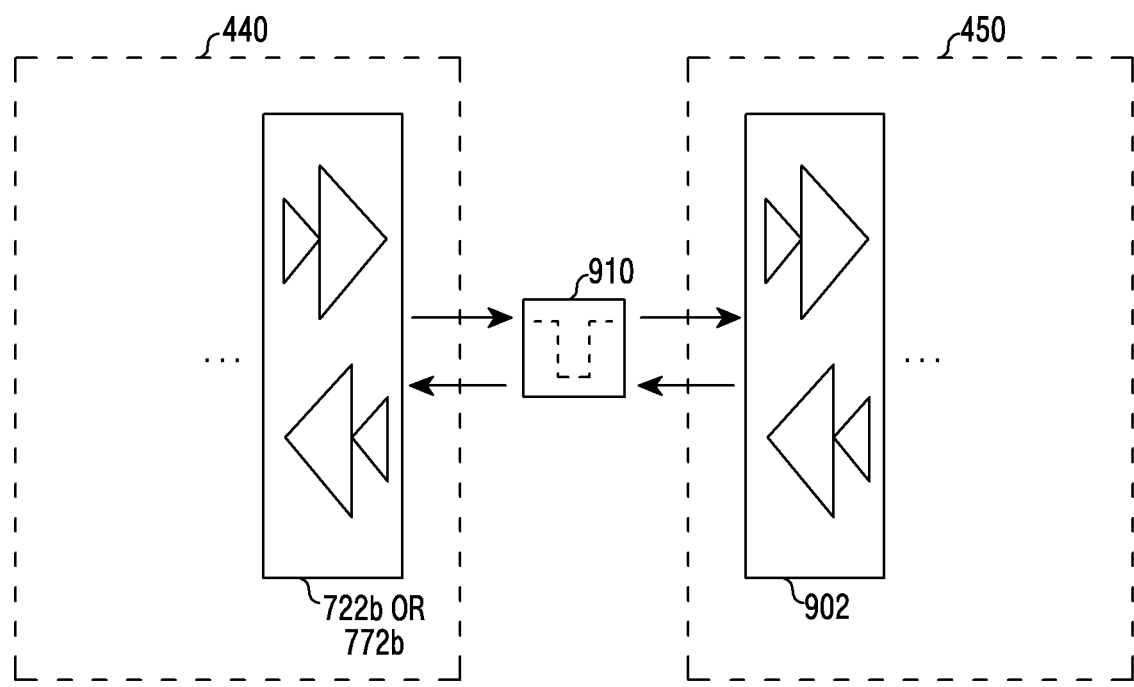
FIG. 9A is a diagram illustrating an example connection structure between a frequency converter and a beamforming unit in a wireless communication system according to various embodiments.

FIG. 9A is a diagram illustrating an example connection structure between the frequency converter 440 and the beamforming unit 450 in a wireless communication system according to various embodiments. FIG. 9A illustrates the case in which the frequency converter 440 and the beamforming unit 450 are implemented as separate ICs. Referring to FIG. 9A, the frequency converter 440 and the beamforming unit 450 may be packaged as separate ICs, and a filter 910 may be disposed between the second amplification circuit 730 or 780 of the frequency converter 440 and an amplification circuit 902 of the beamforming unit 450. The filter 910 may remove an unnecessary signal from a signal delivered between the frequency converter 440 and the beamforming unit 450. The filter 910 may be a band stop filter (BSF).

Figure 9B:
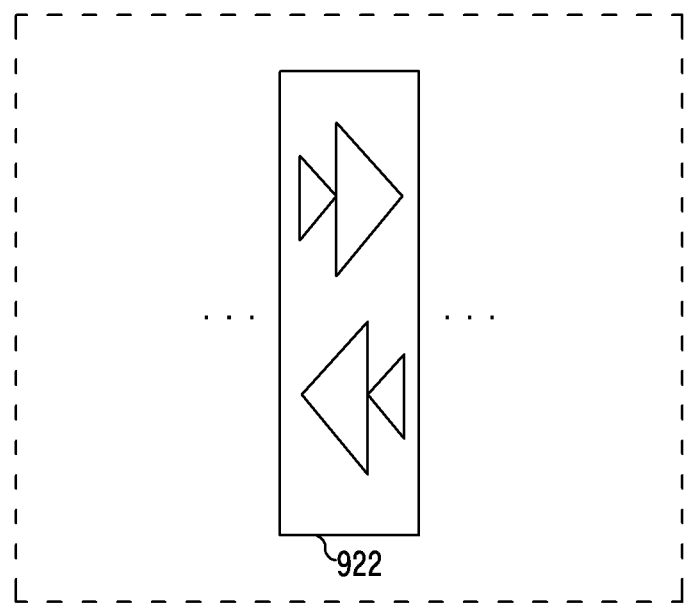
FIG. 9B is a diagram illustrating an example connection structure between a frequency converter and a beamforming unit in a wireless communication system according to various embodiments.

FIG. 9B is a diagram illustrating an example connection structure between the frequency converter 440 and the beamforming unit 450 in a wireless communication system according to various embodiments. FIG. 9B illustrates the case in which the frequency converter 440 and the beamforming unit 450 are implemented as a single IC. If the frequency converter 440 and the beamforming unit 450 are packaged as a single IC, a single amplification circuit 922 may be used instead of the second amplification circuit 812b of the frequency converter 440 and the amplification circuit 902 of the beamforming unit 450. Accordingly, the entire size of a circuit and the amount of power consumed may be relatively reduced.

If the frequency converter 440 and the beamforming unit 450 are implemented as a single IC as illustrated in FIG. 9B, some elements of the frequency converter 440 among the elements of FIG. 7A or 7B and elements of FIG. 8A or FIG. 8B are included, and the broadband amplification circuit 730 (or 780) and the amplification circuit 802 may be replaced with the amplification circuit 922. The frequency combiner/separator 728 (or 778) and the frequency combiner/separator 824a (or 824b) may be disposed before and after the amplification circuit 922. Accordingly, separation and combination of a broadband RF signal is performed before and after the amplification circuit 922. To remove separation and combination of an RF signal, if the frequency converter 440 and the beamforming unit 450 are implemented as a single IC according to another embodiment, the frequency combiner/separator 728 (or 778) and the frequency combiner/separator 824a (or 824b) may be excluded, and the amplification circuit 922 and the combiner/separator 804 may be replaced with amplification circuits and combiner/separators for respective bands.

Figure 10:
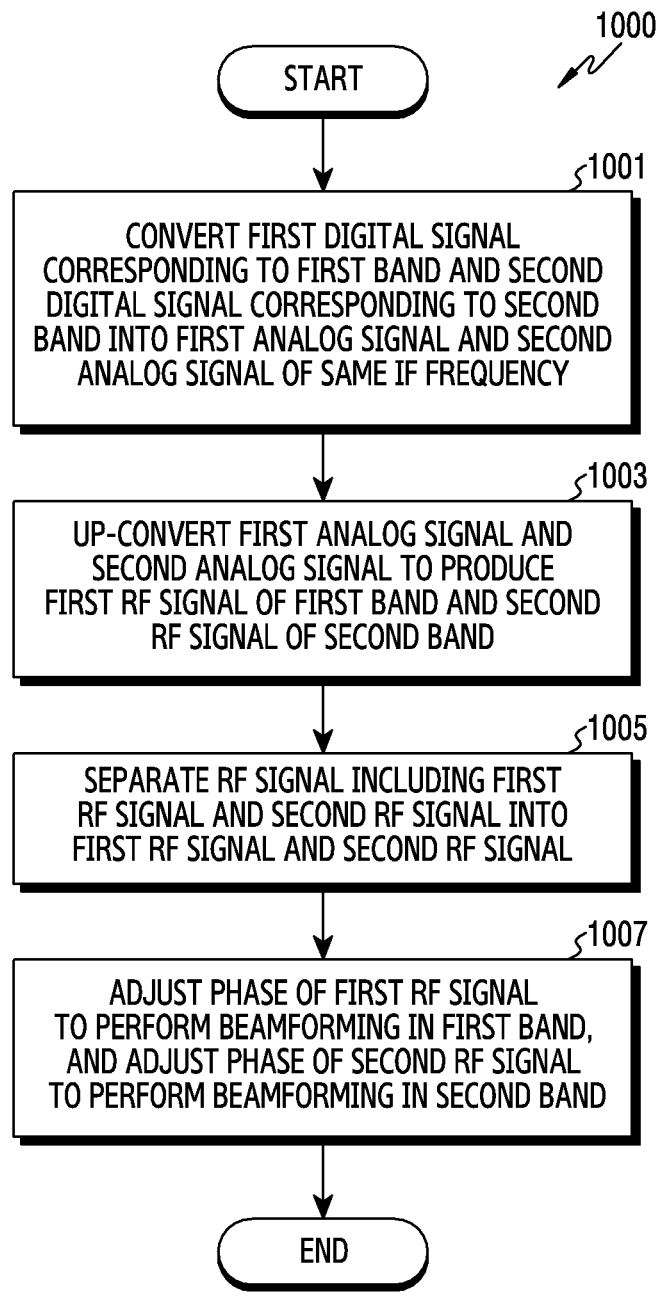
FIG. 10 is a flowchart illustrating an example operation of transmitting a signal via a plurality of bands in a wireless communication system according to various embodiments.

FIG. 10 is a flowchart 1000 illustrating an example operation of transmitting a signal via a plurality of bands in a wireless communication system according to various embodiments. FIG. 10 illustrates an example operation method of the base station 110 or the terminal 120. For ease of description, the subject of the operation is referred to as a "transceiver".

Referring to FIG. 10, in operation 1001, the transceiver may convert a first digital signal corresponding to a first band and a second digital signal corresponding to a second band into a first analog signal and a second analog signal having the same IF frequency. According to various embodiments, the transceiver may perform production of the first analog signal and the production of the second analog signal in parallel, or sequentially.

In operation 1003, the transceiver may up-convert the first analog signal and the second analog signal to produce a first RF signal of the first band and a second RF signal of the second band. In addition, the transceiver may filter the first RF signal and the second RF signal, respectively, after the up-conversion. The transceiver may combine the first RF signal and the second RF signal, so as to produce an RF signal having a third bandwidth.

In operation 1005, the transceiver may separate the RF signal having the third bandwidth including the first RF signal and the second RF signal into the first RF signal and the second RF signal. For example, for phase adjustment in order to perform beamforming, the transceiver may separate the RF signal having the third bandwidth into the first RF signal having a first bandwidth and the second RF signal having a second bandwidth.

In operation 1007, the transceiver may adjust the phase of the first RF signal to perform beamforming in the first band, and may adjust the phase of the second RF signal to perform beamforming in the second band. Phase adjustment may be performed for each chain. That is, the transceiver may separate the RF signal having the third bandwidth into as many signals as the number of chains. Each chain may separate an RF signal into a first RF signal and a second RF signal, and may adjust the phases of the signals.

According to various embodiments as described above, signals of a plurality of bands may be transmitted or received. By transmitting or receiving signals of a plurality of bands using the above-described structure, resource management described in greater detail below with reference to FIG. 11A or FIG. 11B may be performed.

Figure 11A:
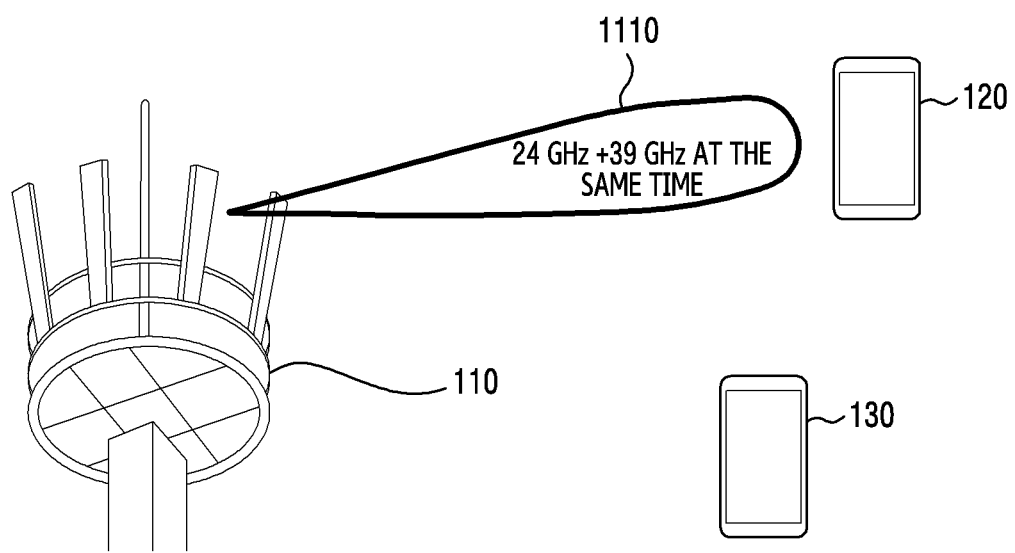
FIG. 11A is a diagram illustrating an example of simultaneously using a plurality bands in a wireless communication system according to various embodiments.

FIG. 11A is a diagram illustrating an example of simultaneously using a plurality bands in a wireless communication system according to various embodiments. Referring to FIG. 11A, the base station 110 may perform communication with the terminal 120 by simultaneously using two bands (e.g., a 24 GHz-band and a 39 GHz-band). Two bands may be used during the same time interval as opposed to orthogonal time intervals. For example, the base station 110 may form a single beam 1110 in two bands (e.g., a 24 GHz-band and a 39 GHz-band).

Figure 11B:
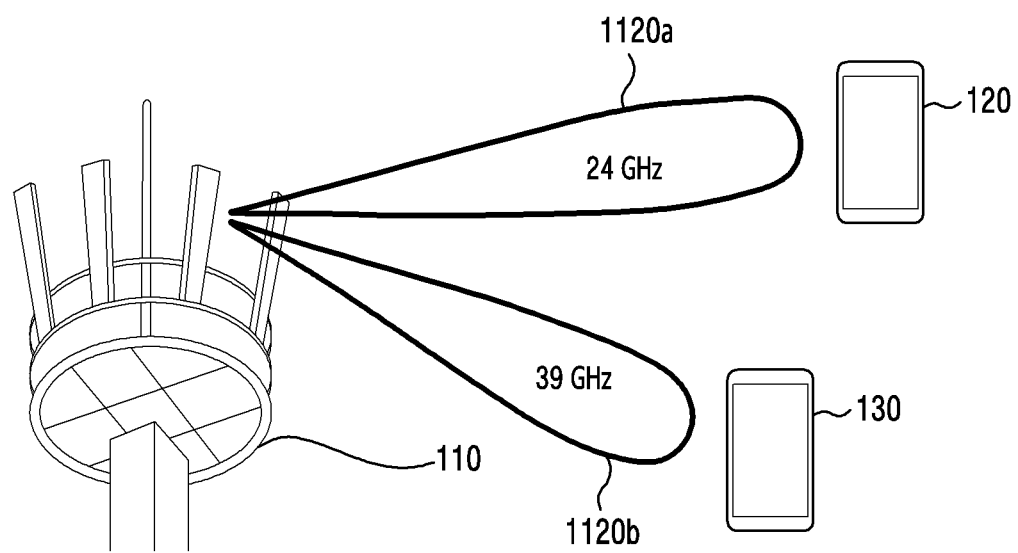
FIG. 11B is a diagram illustrating an example of simultaneously using a plurality bands in a wireless communication system according to various embodiments.

FIG. 11B is a diagram illustrating another example of simultaneously using a plurality bands in a wireless communication system according to various embodiments. Referring to FIG. 11B, the base station 110 may perform communication with the terminal 120 using a first band (e.g., a 24 GHz-band), and may perform communication with the terminal 130 using a second band (e.g., a 39 GHz-band). Two bands may be used during the same time interval as opposed to orthogonal time intervals. For example, the base station 110 may form a first beam 1120*a* in the first band (e.g., a 24 GHz-band) and may form a second beam 1120*b* in the second band (e.g., a 39 GHz-band).

As described above, although different bands having a frequency gap of approximately a few gigahertz to dozens of gigahertz therebetween are managed, the base station 110 may provide a service for a single terminal or for a plurality of different terminals by simultaneously using the plurality of bands.

Methods disclosed in the claims and/or methods according to various embodiments described in the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described example embodiments of the disclosure, an element included in the disclosure is expressed in the singular or the plural according to presented embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been illustrated and described with reference to various example embodiments, it will be understood that the various example embodiments are intended to be illustrative, not limiting. It will be further understood by one skilled in the art that various modifications and changes may be made without departing from the true spirit and full scope of the disclosure, including the appended claims and equivalents thereof.

What is claimed is:

1. A transceiver for a wireless communication system, the transceiver comprising:
    a first circuit configured to up-convert a first digital signal corresponding to a first band and to up-convert a second digital signal corresponding to a second band using a same intermediate frequency (IF) frequency, and to analog-convert the up-converted signals into a first analog signal and a second analog signal;
    a second circuit configured to up-convert the first analog signal and to up-convert the second analog signal to produce a first radio frequency (RF) signal of the first band and a second RF signal of the second band, and to output an RF signal of a third bandwidth including the first RF signal and the second RF signal; and
    a third circuit configured to separate the RF signal of the third bandwidth into the first RF signal and the second RF signal, to adjust a phase of the first RF signal to perform beamforming in the first band, and to adjust a phase of the second RF signal to perform beamforming in the second band.

2. The transceiver of claim 1, wherein the first circuit is configured to produce the first analog signal and the second analog signal using different signal processing paths.

3. The transceiver of claim 1, wherein the first circuit is configured to produce the first analog signal and the second analog signal using a single signal processing path.

4. The transceiver of claim 1, wherein the first circuit is configured to filter the first analog signal and the second analog signal, to amplify the filtered first and second analog signals, and to output the amplified first and second analog signals.

5. The transceiver of claim 1, further comprising:
    a fourth circuit configured to provide frequency signals for the frequency up-conversion by the second circuit.

6. The transceiver of claim 5, wherein the fourth circuit is configured to output frequency signals having different frequencies by converting an output of a single oscillator using different magnifications.

7. The transceiver of claim 5, wherein the fourth circuit is configured to output a plurality of frequency signals having the same frequency.

8. The transceiver of claim 5, wherein the fourth circuit is configured to output frequency signals having different frequencies using a plurality of oscillators.

9. The transceiver of claim 1, wherein the second circuit is configured to filter the first RF signal and the second RF signal and to combine the filtered first and the second RF signals to produce an RF signal of the third bandwidth.

10. The transceiver of claim 1, wherein the third circuit is configured to separate power of the RF signal of the third bandwidth to produce RF signals to be provided to a plurality of chains.

11. The transceiver of claim 1, wherein the third circuit is configured to filter the first RF signal and second RF signal of which the phases are adjusted, and to combine the filtered first and second RF signals, and to emit the combined first and second RF signals via an antenna.

12. The transceiver of claim 1, wherein the first circuit comprises:
    a first mixer and a first digital-to-analog convertor (DAC) configured to produce the first analog signal; and
    a second mixer and a second DAC configured to produce the second analog signal.

13. The transceiver of claim 1, wherein the first circuit comprises a mixer and a DAC commonly used to produce the first analog signal and the second analog signal.

14. The transceiver of claim 1, wherein the first circuit comprises:
    at least one filter configured to filter the first analog signal and the second analog signal; and at least one amplification circuit configured to amplify the filtered first analog signal and the filtered second analog signal.

15. A signal processing device for a transceiver for a wireless communication system, the signal processing device comprising:
    at least one mixer configured to up-convert a first analog signal and a second analog signal of a same intermediate frequency (IF) frequency to produce a first radio frequency (RF) signal of a first band and a second RF signal of a second band; and
    a combiner configured to produce an RF signal of a third bandwidth including the first RF signal and the second RF signal,
    wherein the at least one mixer comprises:
        a first mixer configured to up-convert the first analog signal;
        a second mixer configured to up-convert the second analog signal; and
        a third mixer configured to up-convert the second analog signal which is up-converted by the second mixer.

16. The signal processing device of claim 15, further comprising:
    at least one filter configured to filter the first RF signal and the second RF signal.

17. The signal processing device of claim 15, wherein the at least one mixer comprises:
    the first mixer configured to up-convert the first analog signal using a signal of a first frequency; and
    the second mixer configured to up-convert the second analog signal using a signal of a second frequency.

* * * * *